United States Patent
Yoon et al.

(10) Patent No.: US 9,661,575 B2
(45) Date of Patent: May 23, 2017

(54) METHODS AND APPARATUSES FOR DISCOVERING CENTRAL NODES IN WIRELESS COMMUNICATION SYSTEM

(71) Applicant: Samsung Electronics Co., Ltd., Gyeonggi-do (KR)

(72) Inventors: Sung-Rok Yoon, Gyeonggi-do (KR); Jong-Ho Oh, Gyeonggi-do (KR); Sang-Hyun Chang, Seoul (KR); O-Hyun Jo, Seoul (KR); Kil-Sik Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 14/332,170

(22) Filed: Jul. 15, 2014

(65) Prior Publication Data

US 2015/0016324 A1    Jan. 15, 2015

(30) Foreign Application Priority Data

Jul. 15, 2013  (KR) .................. 10-2013-0082971
Aug. 28, 2013  (KR) .................. 10-2013-0102165

(51) Int. Cl.
*H04W 84/12* (2009.01)
*H04W 52/02* (2009.01)
*H04W 48/20* (2009.01)

(52) U.S. Cl.
CPC ........ *H04W 52/0235* (2013.01); *H04W 48/20* (2013.01); *H04W 84/12* (2013.01); *Y02B 60/50* (2013.01)

(58) Field of Classification Search
CPC . H04W 52/0235; H04W 82/12; H04W 84/12; H04W 48/20; Y02B 60/50
See application file for complete search history.

(56) References Cited

U.S. PATENT DOCUMENTS 7,564,810 B2   7/2009  Hernandez et al.
7,653,357 B2   1/2010  Matsuo et al.
(Continued)

FOREIGN PATENT DOCUMENTS

KR    10-2013-0060739 A    6/2013

OTHER PUBLICATIONS

"Part 11: Wireless LAN Medium Access Control (MAC) and Physical Layer (PHY) Specifications," IEE Standard for Information Technology—Telecommunications and Information Exchange Between Systems, Local and Metropolitan Area Networks—Specific Requirements, IEEE STD 802.11, New York, Mar. 2012, 2793 pages.

(Continued)

*Primary Examiner* — Omar Ghowrwal

(57) ABSTRACT

A method and apparatus for reducing power consumption in a mobile device of a wireless communication system when discovering a central node is provided. The method for operating of a terminal for discovering at least one central node in a wireless communication system includes: generating a probe request signal and transmitting the probe request signal to at least one central node; after transmitting the probe request signal, switching from a normal mode to a low power mode and driving the terminal in the low power mode; in response to a mode switch instruction signal being received from the central node, switching the terminal from the low power mode to the normal mode; and receiving a probe response signal to the probe request signal from the central node in the normal mode.

32 Claims, 21 Drawing Sheets

(56) References Cited

U.S. PATENT DOCUMENTS

| | | | | |
|---|---|---|---|---|
| 2003/0179713 A1* | 9/2003 | Fleming | ............ | H04L 29/12009 370/252 |
| 2004/0235536 A1* | 11/2004 | Kim | ................ | H04W 52/0216 455/574 |
| 2008/0039154 A1* | 2/2008 | Oh | ................... | H04W 52/0235 455/574 |
| 2011/0115431 A1* | 5/2011 | Dunworth | .......... | G06Q 30/0267 320/108 |
| 2012/0257558 A1 | 10/2012 | Shin et al. | | |
| 2013/0136018 A1 | 5/2013 | Jeong et al. | | |
| 2014/0112229 A1* | 4/2014 | Merlin | .............. | H04W 52/0209 370/311 |

OTHER PUBLICATIONS

International Search Report dated Sep. 25, 2014 in connection with International Patent Application No. PCT/KR2014/006295; 3 pages.
Written Opinion of International Searching Authority dated Sep. 25, 2014 in connection with International Patent Application No. PCT/KR2014/006295; 4 pages.

* cited by examiner

METHODS AND APPARATUSES FOR DISCOVERING CENTRAL NODES IN WIRELESS COMMUNICATION SYSTEM

PRIORITY

The present applications is related to and claim priority under 35 U.S.C. §119 to applications filed in the Korean Intellectual Property Office on Jul. 15, 2013 and Aug. 28, 2013 and assigned Serial No. 10-2013-0082971 and 10-2013-0102165, respectively, the contents of which are incorporated herein by reference.

TECHNICAL FIELD

The present disclosure relates to reducing power consumption in a mobile device of a wireless communication system.

BACKGROUND

With the development of information communication technology, there is an increasing demand for various multimedia services in a short-range wireless environment. Wireless Local Area Network (WLAN) is the representative of wireless communication technologies for satisfying such demand. The WLAN enables users to access the Internet wirelessly with their respective mobile devices such as smart phones, smart pads, tablets, laptop computers, etc. in any place where users go. Such a WLAN is evaluated as the most economical and high communication infrastructure in the era of increasing data traffic.

Mobile devices are operated by a battery. As use of data traffic via the mobile device increases, power consumption of the battery rapidly increases. Accordingly, many methods for reducing power consumption in mobile devices are being actively discussed.

SUMMARY

To address the above-discussed deficiencies, it is a primary object to provide a method and apparatus for reducing power consumption in a mobile device of a wireless communication system.

Another aspect of the present disclosure is to provide a method and apparatus for reducing power consumption in a terminal of a wireless communication system in discovering central nodes.

Another aspect of the present disclosure is to provide a method and apparatus for reducing power consumption in a WLAN system when a station discovers access points (APs).

According to an aspect of the present disclosure, a method for operating of a terminal for discovering at least one central node in a wireless communication system includes: transmitting a probe request signal to the at least one central node; after transmitting the probe request signal, switching from a normal mode to a low power mode to drive the terminal in the low power mode; in response to a mode switch instruction signal being received from the central node, switching the terminal from the low power mode to the normal mode; and receiving a probe response signal to the probe request signal from the central node in the normal mode.

According to another aspect of the present disclosure, a method for operating of a central node of a wireless communication system includes: generating a probe response signal in response to a probe request signal being received from at least one terminal; waiting for the probe response signal to be transmitted; transmitting an instruction signal to the terminal, wherein the instruction signal is to instruct to switch the terminal from a normal mode to a low power mode; and transmitting the probe response signal to the terminal.

According to another aspect of the present disclosure, a terminal for discovering at least one central node in a wireless communication system includes: a transmitter configured to transmit a probe request signal to the at least one central node; a controller configured to, after transmitting the probe request signal, switch from a normal mode to a low power mode to drive the terminal in the low power mode, and, in response to a mode switch instruction signal being received from the central node, switch the terminal from the low power mode to the normal mode; and a receiver configured to receive a probe response signal to the probe request signal from the central node in the normal mode.

According to another aspect of the present disclosure, a central node of a wireless communication system includes: a receiver configured to receive a probe request signal from at least one terminal; a controller configured to generate a probe response signal in response to the probe request signal being received, wait for the probe response signal to be transmitted, and generate an instruction signal to instruct to switch the terminal from a normal mode to a low power mode; and a transmitter configured to transmit the instruction signal and transmit the probe response signal to the terminal after transmitting the instruction signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
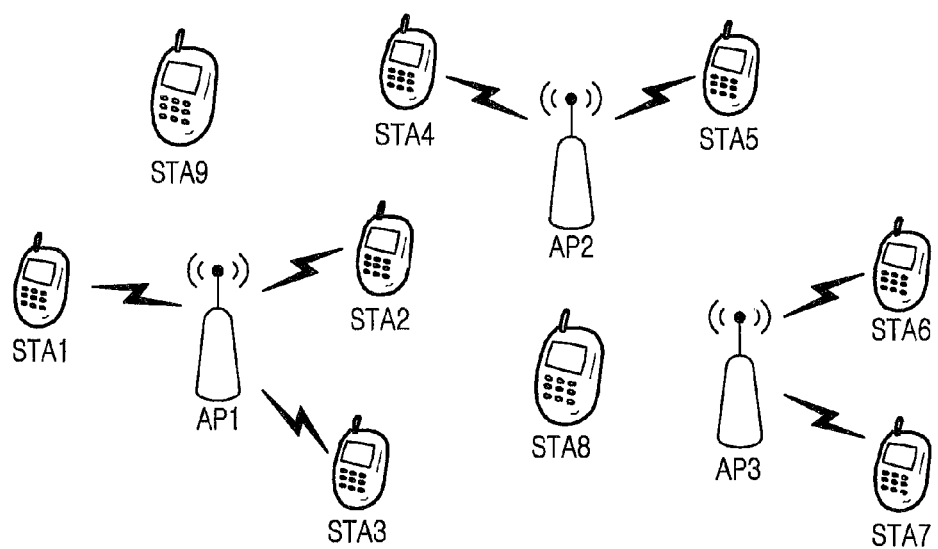
FIG. 1 illustrates a network configuration of a WLAN system according to exemplary embodiments of the present disclosure.

FIGS. 1 through 15B, discussed below, and the various embodiments used to describe the principles of the present disclosure in this patent document are by way of illustration only and should not be construed in any way to limit the scope of the disclosure. Those of ordinary skill in the art will understand that the principles of the present disclosure can be implemented in any certain wireless communication system appropriately arranged.

Exemplary embodiments of the present disclosure relate to reducing power consumption in a mobile device of a wireless communication system. Although exemplary embodiments of the present disclosure are applied to a WLAN system by way of an example, it should be noted that the protection range of exemplary embodiments of the present disclosure is not limited to this. That is, hereinbelow, a method for reducing power consumption when a station (STA) of a WLAN system discovers an AP will be explained. Accordingly, the method according to exemplary embodiments may be useful when a WLAN is mounted in a portable device using a battery and having mobility. Exemplary embodiments of the present disclosure can be applied not only to the WLAN system but also to wireless communication systems which are equipped with a function of discovering a central communication device similar to a WLAN. That is, exemplary embodiments of the present disclosure can be applied to any case in which a terminal of a wireless communication system requests information from one or more central devices (nodes) existing nearby and waits for a response during a predetermined time.

The WLAN system to which exemplary embodiments of the present disclosure are applied uses a communication protocol according to IEEE 802.11 standards. As for an AP discovering protocol of the WLAN, a station transmits a probe request frame to grasp whether neighboring APs exist nearby and what kind of AP exists. When there is an AP that receives the probe request frame, the AP informs the station of the AP's existence by transmitting a probe response frame containing an address of a wireless network managed by the AP and communication environment information. In this case, a plurality of APs may respond to the probe request frame. Accordingly, when the AP receives the probe request frame and transmits the probe response frame promptly, the probe response frame may collide with a frame of another AP. Therefore, each AP transmits the probe response frame after having authority to access a new channel.

Since the WLAN generally uses a distributed channel accessing method, the station should wait for a predetermined time in a waiting mode after transmitting the probe request frame. In this case, the station waits for a long time when WLAN devices are concentrated. In addition, since the WLAN supports up to about 40 channels, when the station performs AP discovering for all supporting channels, the station waits for a very long time to collect the probe response frames. The problem is that the station does not yet connect to the AP and thus wastes power during the waiting time for discovering the AP except for the time for receiving the probe response frame. Accordingly, there is a demand for a new method and apparatus for reducing power consumption when the station discovers the AP in the WLAN system.

A situation in which the WLAN devices are not concentrated is no exception. Since there is no AP nearby, the station stays in a corresponding channel for a pre-defined time and waits for reception. In this case, power is uselessly consumed.

FIG. 1 illustrates a network configuration of a WLAN system to which exemplary embodiments of the present disclosure are applied. The WLAN system includes a plurality of APs (e.g., 3 APs) AP1-AP3, and a plurality of stations (e.g., 9 stations) STA1-STA9. The STA1-STA9 may be portable devices (terminals) such as smart phones, tablets, laptop computers, etc., and STAs which connect to the same AP communicate with one another and can access the Internet via the AP. The STA1-STA7 are terminals which have already connected to the APs and the STA8-STA9 are terminals which do not yet connect to the AP. Exemplary embodiments of the present disclosure, which will be described below, relate to improving efficiency when the STA8 and STA9 which do not yet connect to the AP discover neighboring APs.

According to exemplary embodiments of the present disclosure which will be described below, when a station which uses a battery and has mobility discovers an AP like in the WLAN system shown in FIG. 1, the station is driven in a low power mode in a waiting section while collecting a probe response frame after transmitting a probe request frame, so that power consumption can be reduced. Exemplary embodiments of the present disclosure can be applied to all wireless communication systems in which a terminal transmits a probe request to central nodes to discover any neighboring central node and waits a response to be received for a predetermined time, similarly to the WLAN system.

According to exemplary embodiments of the present disclosure, a method for operating of a terminal for discovering at least one AP in a wireless communication system includes: generating a probe request signal and transmitting the probe request signal to the AP; after transmitting the probe request signal, switching from a normal mode to a low power mode and driving the terminal in the low power mode; in response to a mode switch instruction signal being received from the AP, switching the terminal from the low power mode to the normal mode; and receiving a probe response signal to the probe request signal from the AP in the normal mode.

According to exemplary embodiments of the present disclosure, a method for operating of an AP of a wireless communication system includes: generating a probe response signal in response to a probe request signal being received from at least one station; waiting for the probe response signal to be transmitted; generating an instruction signal to instruct to switch the station from a normal mode to a low power mode and transmitting the instruction signal to the station; and transmitting the probe response signal to the station.

According to exemplary embodiments of the present disclosure, a station for discovering at least one AP in a wireless communication system includes a transmitter, a receiver, and a controller. The transmitter transmits a probe request signal to the AP. After transmitting the probe request signal, the controller switches from a normal mode to a low power mode and drives the station in the low power mode, and, in response to a mode switch instruction signal being received from the AP, switches the station from the low power mode to the normal mode. The receiver receives a probe response signal to the probe request signal from the AP in the normal mode.

According to exemplary embodiments of the present disclosure, an AP of a wireless communication system includes a transmitter, a receiver, and a controller. The receiver receives a probe request signal from at least one station. The controller generates a probe response signal in response to the probe request signal being received, waits for the probe response signal to be transmitted, and generates an instruction signal to instruct to switch the station from a normal mode to a low power mode. The transmitter transmits the probe response signal to the station after transmitting the instruction signal to the station.

Figure 2A:
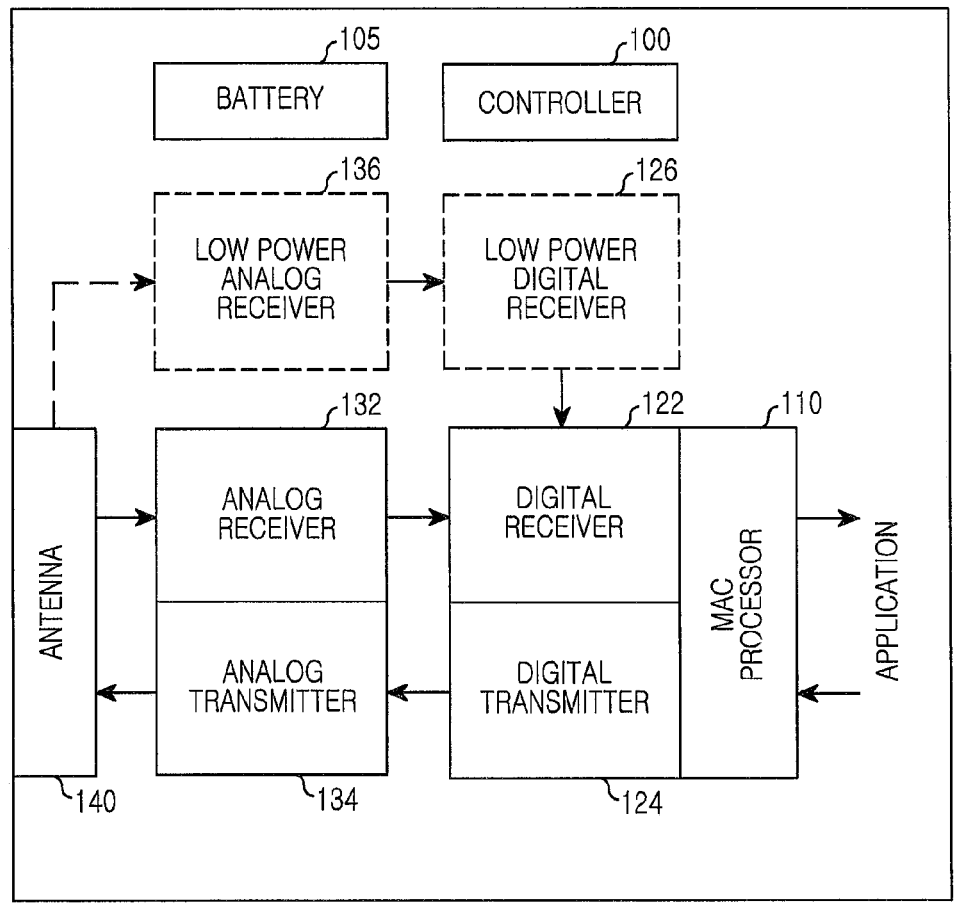
FIGS. 2A to 2C illustrate a configuration of a station according to exemplary embodiments of the present disclosure.
Figure 2B:
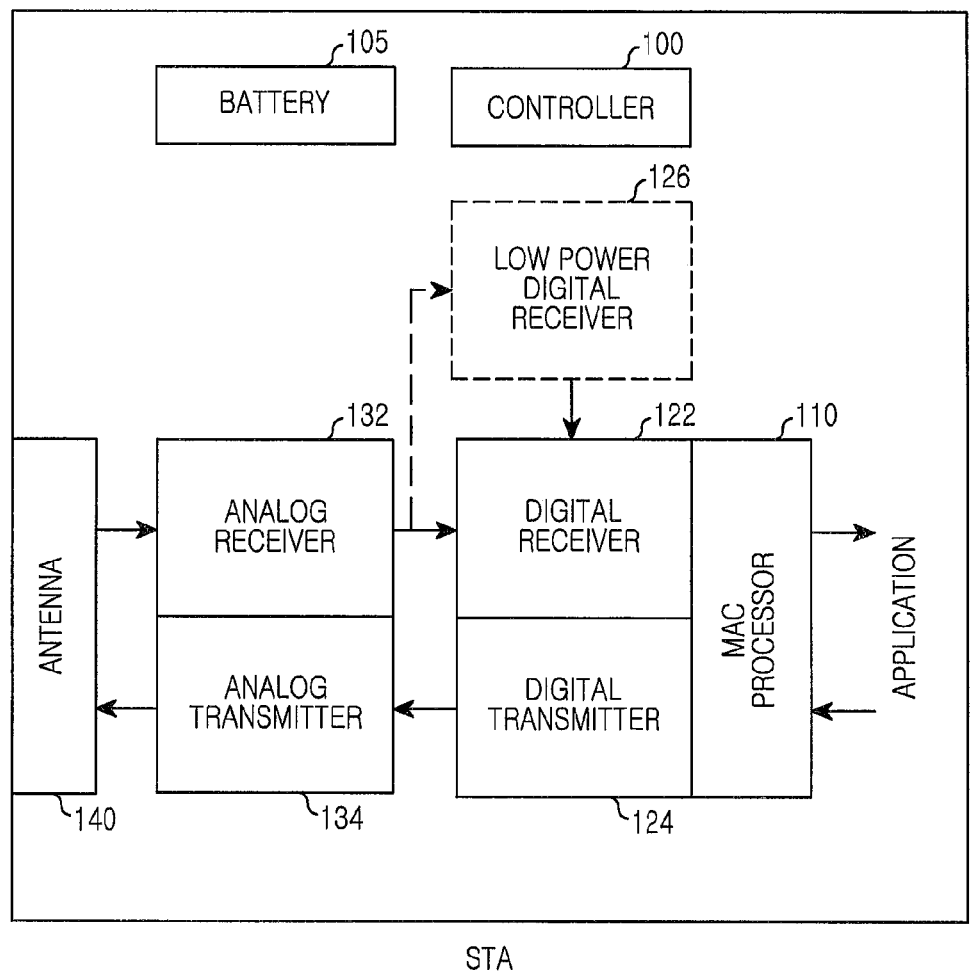
Figure 2C:
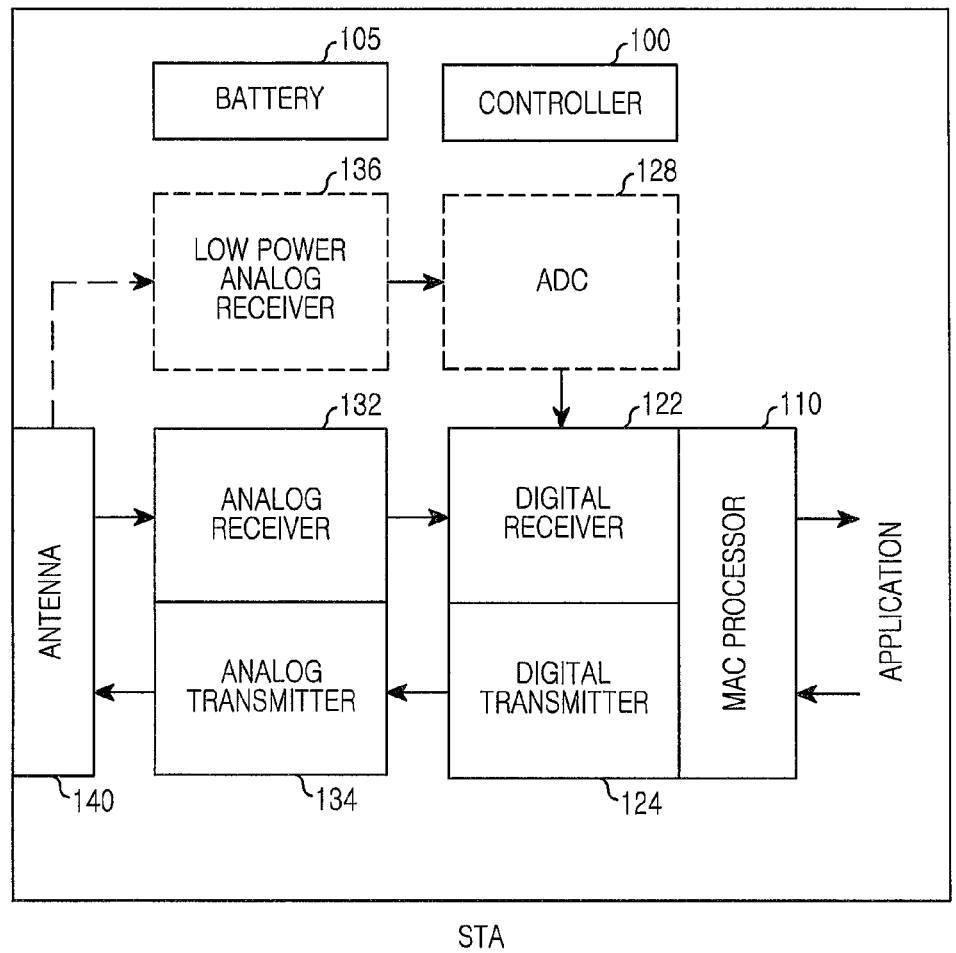

FIGS. 2A to 2C illustrate a configuration of a station according to exemplary embodiments of the present disclosure. The station includes a controller 100, a Medium Access Control (MAC) processor 110, a digital receiver 122, a digital transmitter 124, an analog receiver 132, an analog transmitter 134, and an antenna 140. The elements of the station receive power from a battery 105.

The controller 100 is an element for controlling an overall operation of the station and may be implemented as one or more processors. According to exemplary embodiments of the present disclosure, the controller 100 controls a normal mode operation and a low power mode operation. In the normal mode, the controller 100 controls power supply of the battery 105 to receive signals via the analog receiver 132 and the digital receiver 122 and transmit signals via the digital transmitter 124 and the analog transmitter 134. In the low power mode, the controller 100 controls power supply of the battery 105 to receive signals via a low power analog receiver 136 and a low power digital receiver 126. The controller 100 controls operations of generating a probe request frame and transmitting the probe request frame to the AP in the normal mode of the station. After transmitting the probe request frame, the controller 100 switches the station from the normal mode to the low power mode. In addition, in response to a mode switch instruction signal being received from the station in the low power mode, the controller 100 switches the station to the normal mode. The controller 100 which switches to the normal mode controls an operation of receiving a probe response frame. According to an exemplary embodiment, the mode switch instruction signal may be a low power preamble. According to another exemplary embodiment, the mode switch instruction signal may be a binary sequence.

The antenna 140 receives signals from the AP and transmits signals to the AP. The analog receiver 132 performs analog/radio frequency (RF) processing with respect to the signals received from the antenna 140 and outputs digital signals. The digital receiver 122 performs digital processing with respect to the signals transmitted from the analog receiver 132. The analog receiver 132 and the digital receiver 122 are elements of a physical layer for demodulating and decoding data of the received signals. The MAC processor 110 performs MAC layer processing with respect to the signals transmitted from the digital receiver 122 and transmits the signals to an application layer, and receives signals transmitted from the application layer and performs MAC layer processing. The digital transmitter 124 performs digital processing with respect to the signals transmitted from the MAC processor 110. The analog transmitter 134 performs analog/RF processing with respect to the signals transmitted from the digital transmitter 124. The digital transmitter 124 and the analog transmitter 134 are elements of a physical layer for coding and modulating data of the transmission signals.

In addition, according to exemplary embodiments of the present disclosure, the station includes elements which operate in the low power mode and detect signals provided from the AP in the low power mode. According to an exemplary embodiment, the station may further include a low power digital receiver 126 and a low power analog receiver 136 as shown in FIG. 2A. These elements operate in the low power mode under control of the controller 100 and detect a mode switch instruction signal transmitted from the AP in the low power mode. The mode switch instruction signal may be a low power preamble as explained below.

According to another exemplary embodiment, the station further includes a low power digital receiver 126 as show in FIG. 2B. The low power digital receiver 126 and the analog receiver 132 are elements which operate in the low power mode under control of the controller 100 and detect a mode switch instruction signal transmitted from the AP in the low power mode. The mode switch instruction signal may be a low power preamble as explained below.

According to another exemplary embodiment, the station further includes a low power analog receiver 136 and an analog-to-digital converter (ADC) 128 as shown in FIG. 2C. These elements operate in the low power mode under control of the controller 100 and detect a mode switch instruction signal transmitted from the AP in the low power mode. The mode switch instruction signal may be a binary sequence as explained below.

Figure 3A:
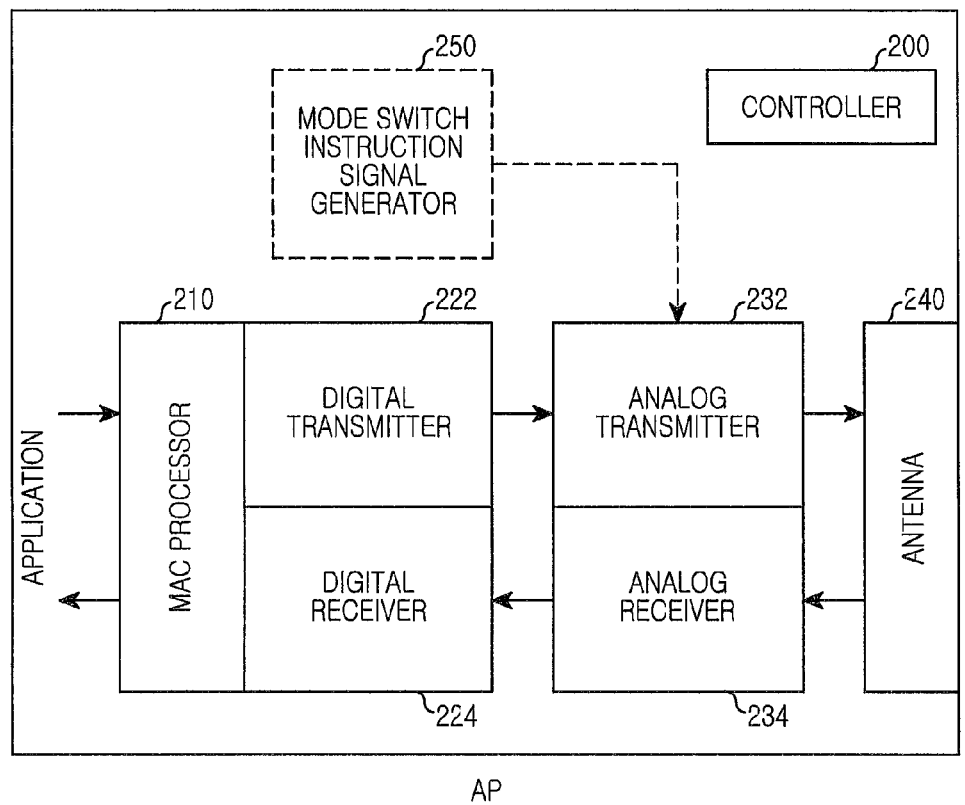
FIGS. 3A to 3C illustrate a configuration of an access point (AP) according to an exemplary embodiment of the present disclosure.
Figure 3B:
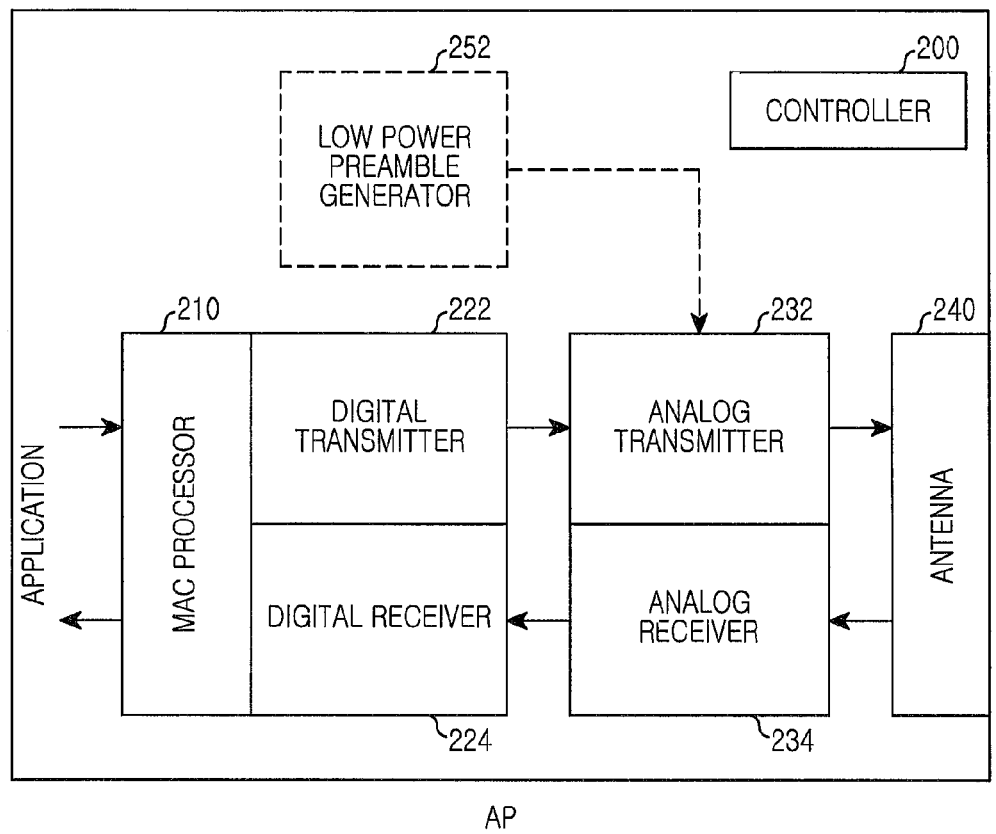
Figure 3C:
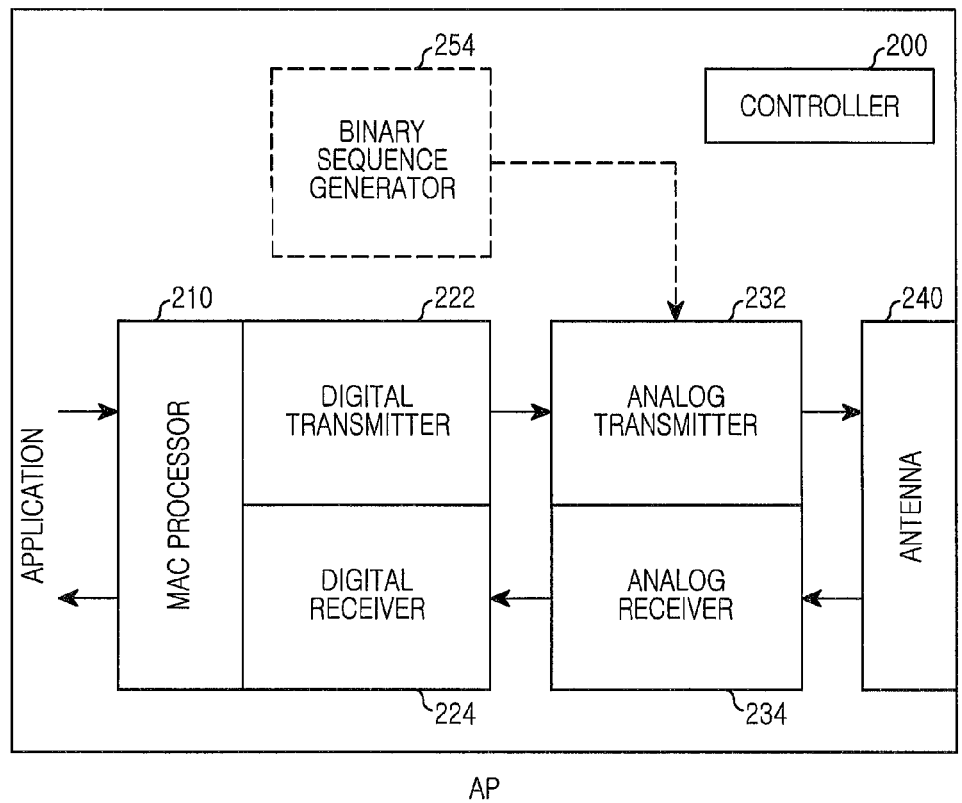

FIGS. 3A to 3C illustrate a configuration of an AP according to an exemplary embodiment of the present disclosure. The AP includes a controller 200, a MAC processor 210, a digital transmitter 222, an analog transmitter 224, an analog receiver 234, a digital receiver 224, and an antenna 240.

The controller 200 is an element for controlling an overall operation of the AP and may be implemented as one or more processors. The controller 200 controls operations according to an exemplary embodiment of the present disclosure. The controller 200 controls operations of generating a probe response frame in response to a probe request frame being received from the station and transmitting the probe response frame to the station. In addition, the controller 200 controls operations of generating a mode switch instruction signal and transmitting the mode switch instruction signal prior to transmitting the probe response frame to the station.

The antenna 240 receives signals from the station and transmits signals to the station. The analog receiver 234 performs analog/radio frequency (RF) processing with respect to the signals received from the antenna 240 and outputs digital signals. The digital receiver 224 performs digital processing with respect to the signals transmitted from the analog receiver 234. The analog receiver 234 and the digital receiver 224 are elements of a physical layer for demodulating and decoding data of the received signals. The MAC processor 210 performs MAC layer processing with respect to the signals transmitted from the digital receiver 224 and transmits the signals to an application layer, and receives signals transmitted from the application layer and performs MAC layer processing. The digital transmitter 222 performs digital processing with respect to the signals transmitted from the MAC processor 210. The analog transmitter 232 performs analog/RF processing with respect to the signals transmitted from the digital transmitter 222. The digital transmitter 222 and the analog transmitter 232 are elements of a physical layer for coding and modulating data of the transmission signals.

In addition, according to an exemplary embodiment of the present disclosure, the AP includes a mode switch instruction signal generator 250 for generating a mode switch instruction signal as shown in FIG. 3A. According to an exemplary embodiment, the mode switch instruction signal generator 250 may be a low power preamble generator 252 as shown in FIG. 3B. According to an exemplary embodiment, the low power preamble may be a preamble which operates at low speed according to the WLAN standard 802.ah. According to another exemplary embodiment, the low power preamble generator 252 may be a binary sequence generator 254 as shown in FIG. 3C.

Figure 4:
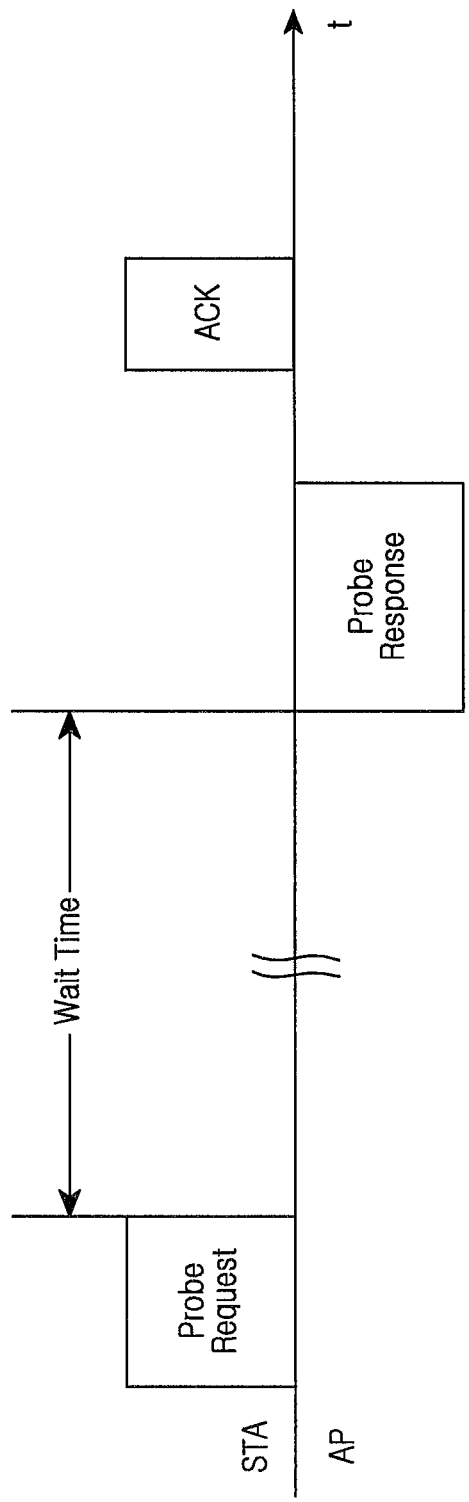
FIG. 4 illustrates an AP discovering procedure in a related-art WLAN system.
Figure 5:
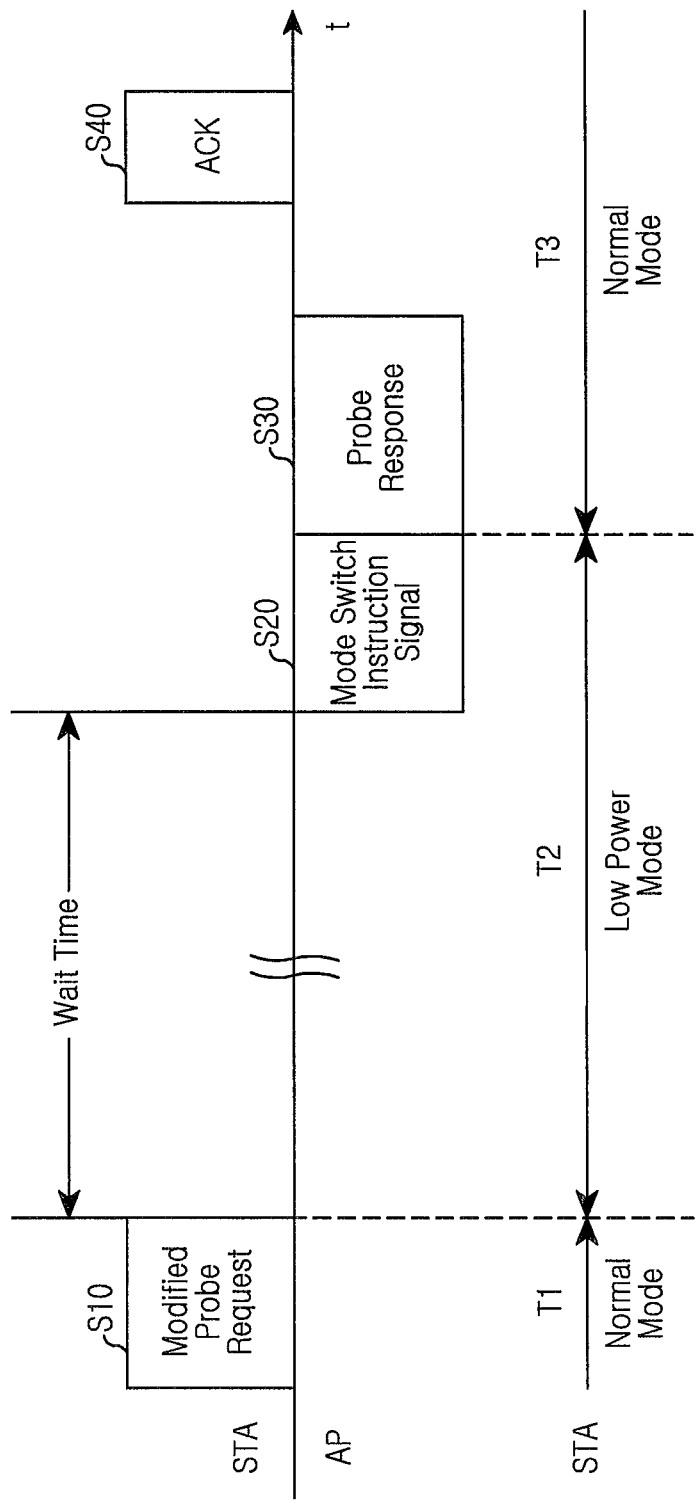
FIG. 5 illustrates an AP discovering procedure in a WLAN system according to an exemplary embodiment of the present disclosure.

FIG. 4 illustrates an AP discovering procedure in a related-art WLAN system, and FIG. 5 illustrates an AP discovering procedure in a WLAN system according to an exemplary embodiment of the present disclosure. These drawings show a frame exchange between an AP and an STA when the WLAN station uses an active scan in discovering the AP.

Referring to FIG. 4, a related-art station requests information of neighboring APs by broadcasting a probe request frame, and an AP provides information on the AP and a network managed by the AP via a probe response frame. In this case, there is a delay after the station transmits the probe request frame until the station receives the probe response frame. This delay time corresponds to a time that is required for the AP to have an opportunity to transmit the probe response frame, and may be a certain time in a WLAN network which uses a distributed channel accessing method. The station which transmits the probe request frame does not yet connect to a specific AP and thus is not capable of data communication. Thus, all frames except for the probe response frame received during this time are useless. However, since the station does not know when the probe response frame is received, the station consumes power in a reception mode during this time. This time becomes longer as more APs or stations share the same channel and as the AP has more frames to be transmitted in the queue in addition to the probe response frame. In other words, waste of power becomes more serious during this time in an environment where many APs and stations are concentrated.

Referring to FIG. 5, according to an exemplary embodiment of the present disclosure, the above-described problem of waste of power can be solved by modifying a probe request frame S10 and transmitting a mode switch instruction signal S20 prior to transmitting a probe response frame S30d. The station transmits a probe request frame S10 containing the station's own identification during a section T1. This identification may be a certain number within a limited range (for example, a certain number less than 64) or may be some lower bit of a MAC address of the station. The AP which receives the probe request frame transmits the mode switch instruction signal S20 prior to transmitting the probe response frame S30 during a section T3. The mode switch instruction signal S20 is a signal which is detectable by the station in the low power mode. According to an exemplary embodiment, the mode switch instruction signal S20 may be a low power preamble. The low power preamble includes identification information of the station which is transmitted via the probe request frame. According to an exemplary embodiment, the low power preamble may be a preamble which operates at low speed according to the WLAN standard 802.11ah. According to another exemplary embodiment, the low power preamble may be a binary sequence.

The station may operate in the low power mode after transmitting the probe request frame until receiving the probe response frame. That is, the station operates in the normal mode during the section T1, operates in the low power mode during the section T2, and operates in the normal mode during the section T3. The section T2 is a time section after the probe request frame S10 is transmitted until the mode switch instruction signal S20 is received. The section T1 is a section during which the probe request frame S10 for discovering the AP is transmitted and the section T3 is a section during which the probe response frame S30 is received. When the probe response frame S30 is received during the section T3, the station transmits an acknowledgement (ACK) signal S40 to the AP in response to the probe response frame S30. According to an exemplary embodiment, in the low power mode, the station may drive only the low power analog receiver 136 and the low power digital receiver 126 as shown in FIG. 2A. According to another exemplary embodiment, in the low power mode, the station may drive only the analog receiver 132 and the low power digital receiver 126 as shown in FIG. 2B. According to another exemplary embodiment, in the low power mode, the station may drive only the low power analog receiver 136 and the ADC 128 as shown in FIG. 2C.

Figure 6:
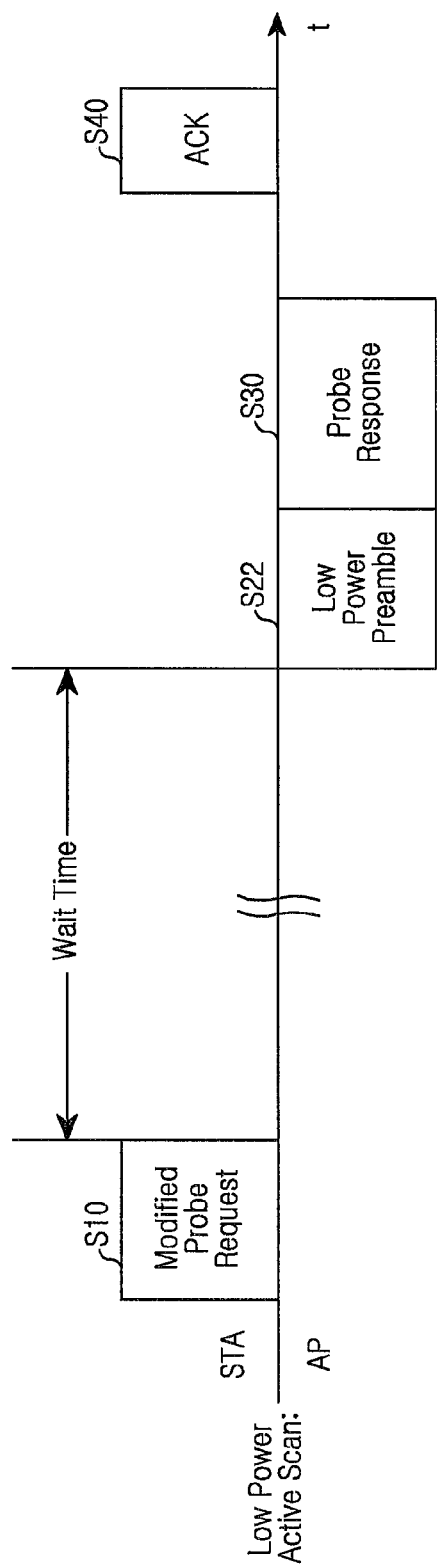
FIG. 6 illustrates an example of a mode switch instruction signal used in an AP discovering procedure according to an exemplary embodiment of the present disclosure.

FIG. 6 illustrates an example of a mode switch instruction signal used in an AP discovering procedure according to an exemplary embodiment of the present disclosure. For example, an example of the mode switch instruction signal generated in the AP shown in FIG. 5 is illustrated. The mode switch instruction signal S20 shown in FIG. 5 may be implemented as a low power preamble S22. For example, the low power preamble S22 generated in the AP may be detected by the low power analog receiver 136 and the low power digital receiver 126 as shown in FIG. 2A. In another example, the low power preamble S22 generated in the AP may be detected by the analog receiver 132 and the low power digital receiver 126 as shown in FIG. 2B.

Figure 7:
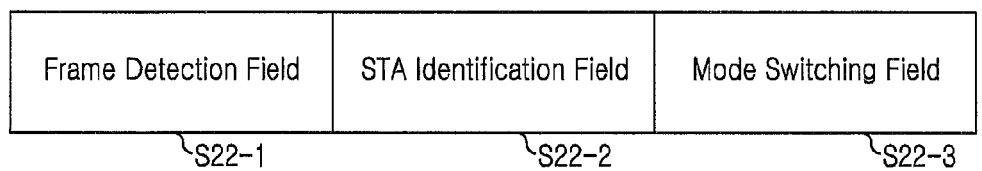
FIG. 7 illustrates a configuration of a low power preamble used in an AP discovering procedure according to an exemplary embodiment of the present disclosure.

FIG. 7 illustrates a configuration of a low power preamble used in an AP discovering procedure according to an exemplary embodiment of the present disclosure.

Referring to FIG. 7, the low power preamble S22 includes three fields S22-1, S22-2, and S22-3. The frame detection field S22-1 is a field which includes a pre-defined training symbol for THE reception station to detect the preamble. The station identification field S22-2 is a field which includes the identification information of the station which has been previously transmitted via the probe request frame S20. The mode switching field S22-3 is a field for guaranteeing a time required to switch from the low power mode to the normal mode. In practice, the three fields may be independently distinguished from one another or may be combined with one another to perform a complex function.

Figure 8A:
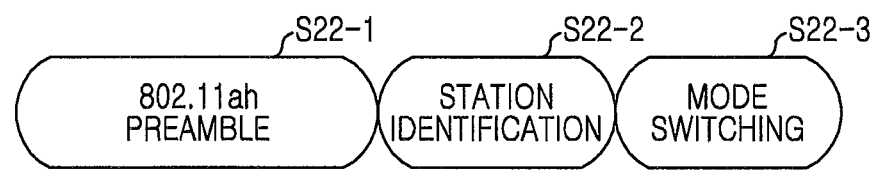
FIGS. 8A to 8C illustrates various configuration examples of a low power preamble used in an AP discovering procedure according to an exemplary embodiment of the present disclosure.
Figure 8B:
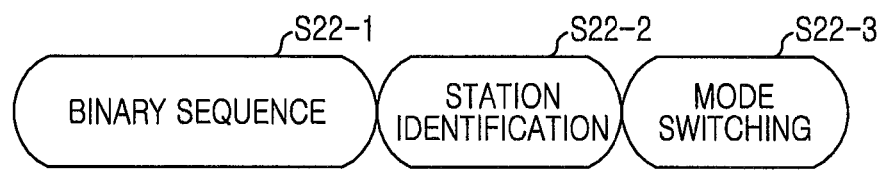
Figure 8C:
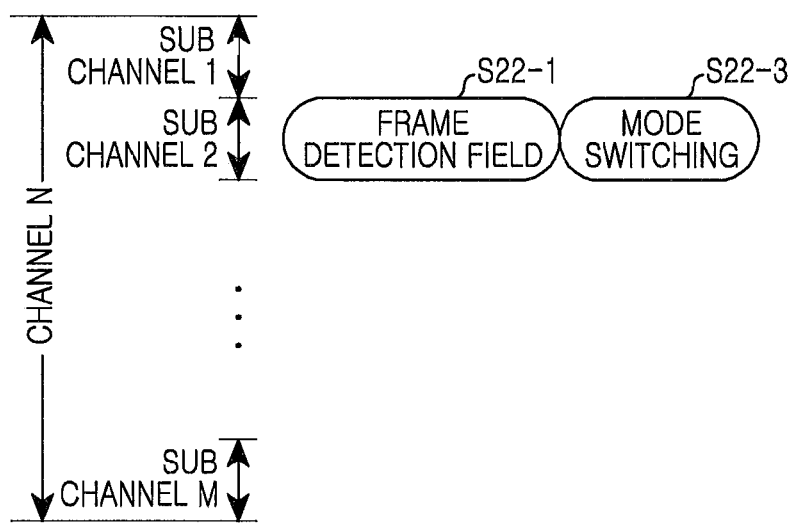

FIGS. 8A to 8C illustrate various configuration examples of a low power preamble used in an AP discovering procedure according to an exemplary embodiment of the present disclosure.

Referring to FIG. 8A, the low power preamble S22 includes an 802.11ah preamble S22-1, a station identification field S22-2, and a mode switching field S22-3 as frame detection fields. The low power preamble S22 in this example may be implemented by making a sampling rate (e.g., 100 us) lower than a sampling rate (e.g., 8 us) of a preamble used in the related-art WLAN system. In this case, the station in the low power mode may drive only the low power analog receiver 136 and the low power digital receiver 126 or may drive only the analog receiver 132 and the low power digital receiver 126. The frame detection field S22-1 may include a preamble of 802.11ah of the WLAN standard which operates at low speed. This preamble can be detected simply by decreasing a clock frequency of a related-art preamble detector.

Referring to FIG. 8B, the low power preamble S22 includes a binary sequence S22-1, a station identification field S22-2, and a mode switching field S22-3 as frame detection fields. In this example, a binary sequence is used as an example of the frame detection field S22-1. The binary sequence S22-1 generated in the AP may be detected by the low power analog receiver 136 and the ADC 128 as shown in FIG. 2C. In this case, since the low power preamble is simple in comparison with a preamble used in the related-art WLAN system, the low power analog receiver 136 and the ADC 128 which have simple and low performance may be used.

Referring to FIG. 8C, the low power preamble S22 includes a frame detection field S22-1 and a mode switching field S22-3. In this example, time resources can be saved by loading station identification information into a frequency domain and transmitting the station identification information instead of including the station identification information in a separate time domain field. Since the low power preamble uses a low speed sampling rate, the low power preamble uses a bandwidth narrower than that of the related-art WLAN. For example, when the sampling rate is reduced by 1/M (e.g., 1/10), the bandwidth is 1/M (e.g., 1/10) times reduced. Accordingly, M number of sub channels (e.g., 10 sub channels) can be formed in an existing single channel by adjusting only a center frequency. In this case, a specific sub channel may be selected and may be used as station identification information. For example, sub channel 2 is used as station identification information in FIG. 8C.

Figure 9:
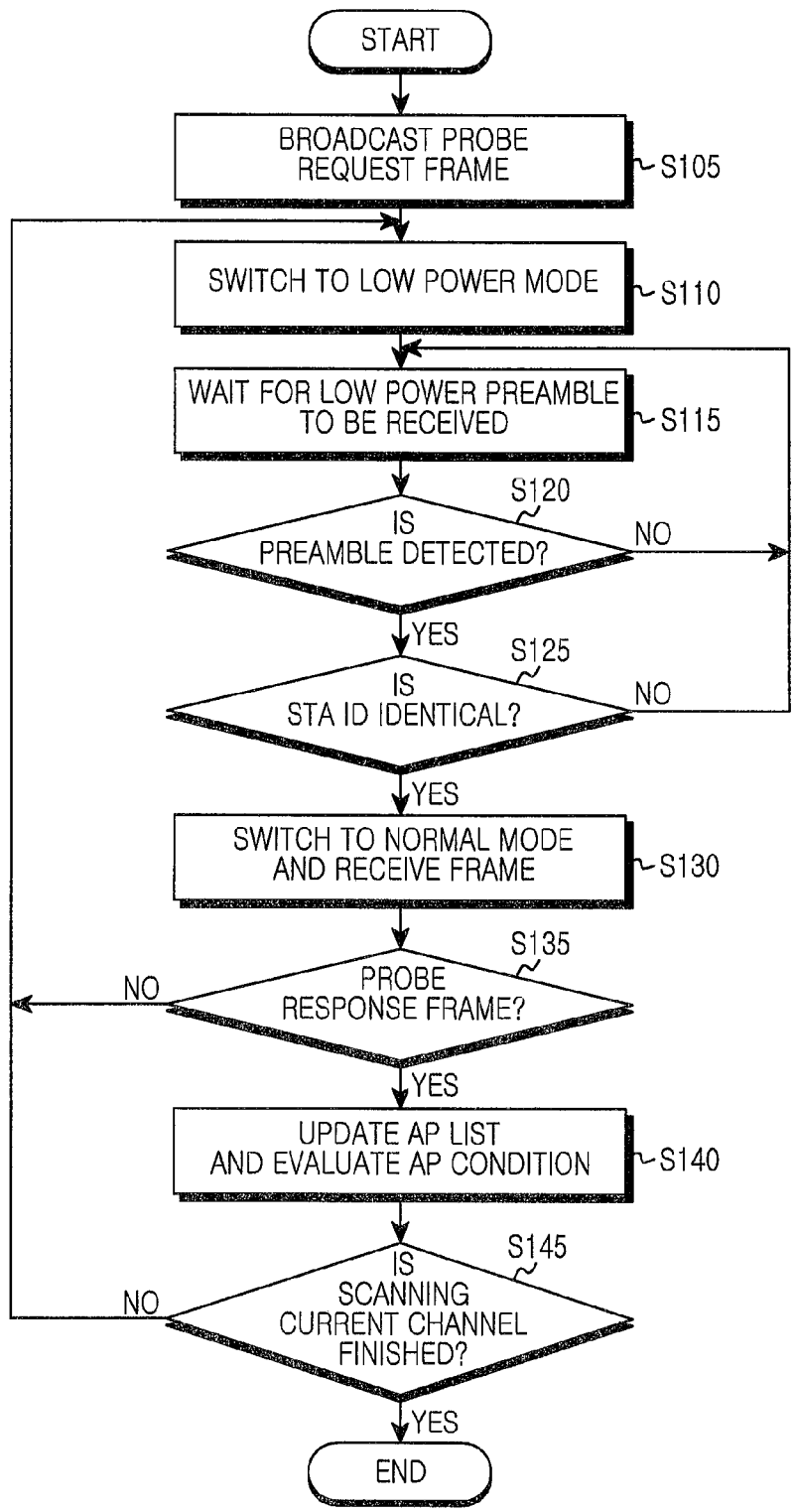
FIG. 9 is a flowchart illustrating an operation of a station for an AP discovering operation according to an exemplary embodiment of the present disclosure.

FIG. 9 is a flowchart illustrating an operation of a station for discovering an AP according to an exemplary embodiment of the present disclosure. The flowchart shown in FIG. 9 an example and may be changed without departing from the scope of the present disclosure. For example, the AP discovering operation may be performed for each channel for scanning the AP and operations of setting a maximum time for staying in a corresponding channel and stopping scanning may be performed. Such operations are the same as those in the related-art method and thus are not illustrated. In addition, the low power preamble is used as the mode switch instruction signals in FIG. 9. However, it should be noted that when another signal is used as the mode switch instruction signal detectable in the low power mode, the same processing operations are performed.

Referring to FIG. 9, the station generates a probe request frame in the normal mode and broadcasts the probe request frame (S105). After transmitting the probe request frame, the station switches to the low power mode (S110) and waits for the low power preamble to be received (S115). After switching to the low power mode, only some element of the receiver elements may be driven as shown in FIGS. 2A to 2C. According to an exemplary embodiment, only the low power analog receiver 136 and the low power digital receiver 126 may receive power from the battery 105 and power supply to the other elements may be shut off as shown in FIG. 2A. According to another exemplary embodiment, only the analog receiver 132 and the low power digital receiver 126 may receive power from the battery 105 and power supply to the other elements may be shut off as shown in FIG. 2B. According to another exemplary embodiment, only the low power analog receiver 136 and the ADC 128 may receive power from the battery 105 and power supply to the other elements may be shut off as shown in FIG. 2C.

The station determines whether the low power preamble is detected or not, and, when the low power preamble is detected, determines whether a station identification (STA ID) included in the low power preamble is identical to, matches, or is the same as the station's own identification (S120 and S125). When the low power preamble is detected and the station identification is identical, the station switches to the normal mode and receives a probe response frame (S130). After switching to the normal mode, the station normally supplies power to the analog receiver 132, the digital receiver 122, the digital transmitter 124, and the analog receiver 134 from among the elements of the station shown in FIGS. 2A to 2C.

When the station determines that probe response frame is received (S135), the station updates a list of APs and evaluates an AP condition (S140), and determines whether to finish scanning a current channel (S145). The AP condition is evaluated based on information provided by the received probe response information. When the station evaluates a corresponding AP as having a good condition for connecting, that is, when it is determined that requirements such as a signal intensity, a support function, a speed, a delay time, etc., are satisfied, the station finishes scanning the channel in early stage.

Figure 10:
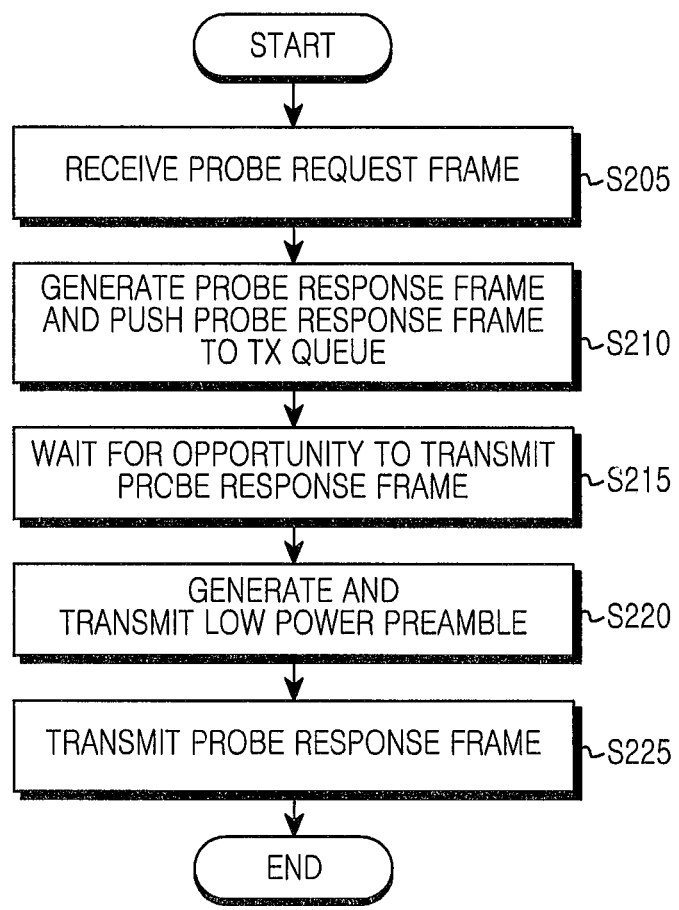
FIG. 10 is a flowchart illustrating an operation of an AP for an AP discovering operation according to an exemplary embodiment of the present disclosure.

FIG. 10 is a flowchart illustrating an operation of an AP for an AP discovering operation according to an exemplary embodiment of the present disclosure. The flowchart shown in FIG. 10 an example and may be changed without departing from the scope of the present disclosure. For example, FIG. 10 illustrates operations of the AP for generating a probe response frame in response to a probe request frame received from a single station, and transmitting the probe response frame. However, when a plurality of stations exist, the same flowchart may be extended and used. In addition, although FIG. 10 illustrates operations subsequent to the operation of receiving the probe request frame, it is understood by those of ordinary skill in the art that the AP performs various other operations in addition to these operations.

Referring to FIG. 10, the AP receives a probe request frame supporting the low power mode from the station (S205). In response to the probe request frame being received, the AP generates a probe response frame and pushes the probe response frame to a TX queue (not shown) (S210). The AP waits for a TX opportunity to transmit the probe response frame (S215). At the TX opportunity for the probe response frame, the AP generates a low power preamble and transmits the low power preamble to the station (S220). After transmitting the low power preamble, the AP transmits the probe response frame to the station (S225).

The above-described exemplary embodiment corresponds to a case in which stations perform an AP discovering procedure according to an exemplary embodiment of the present disclosure. In the WLAN system, not only the stations according to an exemplary embodiment of the present disclosure but also existing legacy stations may coexist. The legacy stations cannot identify the mode switch instruction signal attached to the probe response frame according to an exemplary embodiment of the present disclosure and thus determines that a wireless channel is empty. Therefore, the legacy stations may try to transmit the frames. In this case, as a collision occurs between the probe response frame and the frame transmitted by the legacy station, it is impossible to receive a normal frame.

According to another exemplary embodiment of the present disclosure, which will be described below, the AP may prevent the collision between the frames by transmitting a Clear-to-Send (CTS) frame prior to transmitting the probe response frame to which the mode switch instruction signal is attached.

Figure 11:
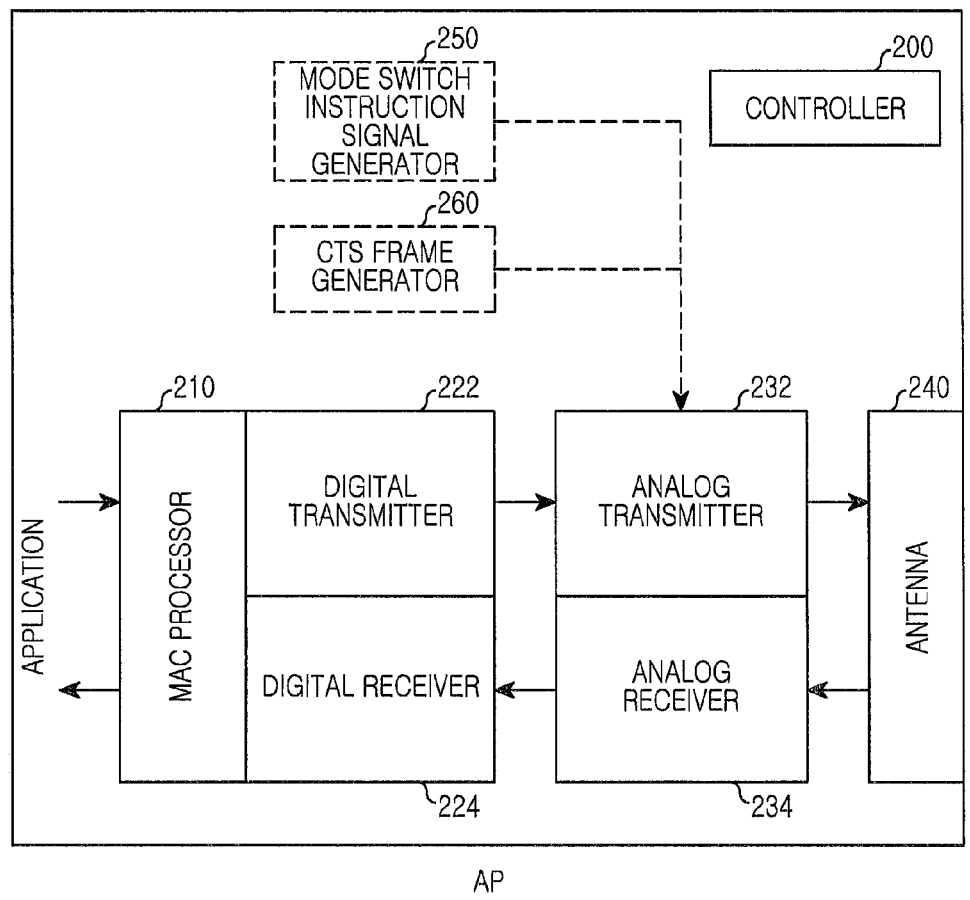
FIG. 11 illustrates a configuration of an AP according to another exemplary embodiment of the present disclosure.

FIG. 11 is a view illustrating a configuration of an AP according to another exemplary embodiment of the present disclosure. The AP includes a controller 200, a MAC processor 210, a digital transmitter 222, an analog, transmitter 224, an analog receiver 234, a digital receiver 224, and an antenna 240.

The controller 200 is an element for controlling an overall operation of the AP and may be implemented as one or more processors. The controller 200 controls operations according to another exemplary embodiment of the present disclosure. The controller 200 controls operations of generating a probe response frame in response to a probe request frame being received from the station and transmitting the probe response frame to the station. In addition, the controller 200 controls operations of generating a CTS frame and a mode switch instruction signal and transmitting the CTS and the mode switch instruction signal prior to transmitting the probe response frame to the station.

The antenna 240 receives signals from the station and transmits signals to the station. The analog receiver 234 performs analog/radio frequency (RF) processing with respect to the signals received from the antenna 240 and outputs digital signals. The digital receiver 224 performs digital processing with respect to the signals transmitted from the analog receiver 234. The analog receiver 234 and the digital receiver 224 are elements of a physical layer for demodulating and decoding data of the received signals. The MAC processor 210 performs MAC layer processing with respect to the signals transmitted from the digital receiver 224 and transmits the signals to an application layer, and receives signals transmitted from the application layer and performs MAC layer processing. The digital transmitter 222 performs digital processing with respect to the signals transmitted from the MAC processor 210. The analog transmitter 232 performs analog/RF processing with respect to the signals transmitted from the digital transmitter 222. The digital transmitter 222 and the analog transmitter 232 are elements of a physical layer for coding and modulating data of the transmission signals.

In addition, according to another exemplary embodiment of the present disclosure, the AP includes a mode switch instruction signal generator 250 for generating a mode switch instruction signal and a CTS frame generator 260 for generating a CTS frame.

Figure 12:
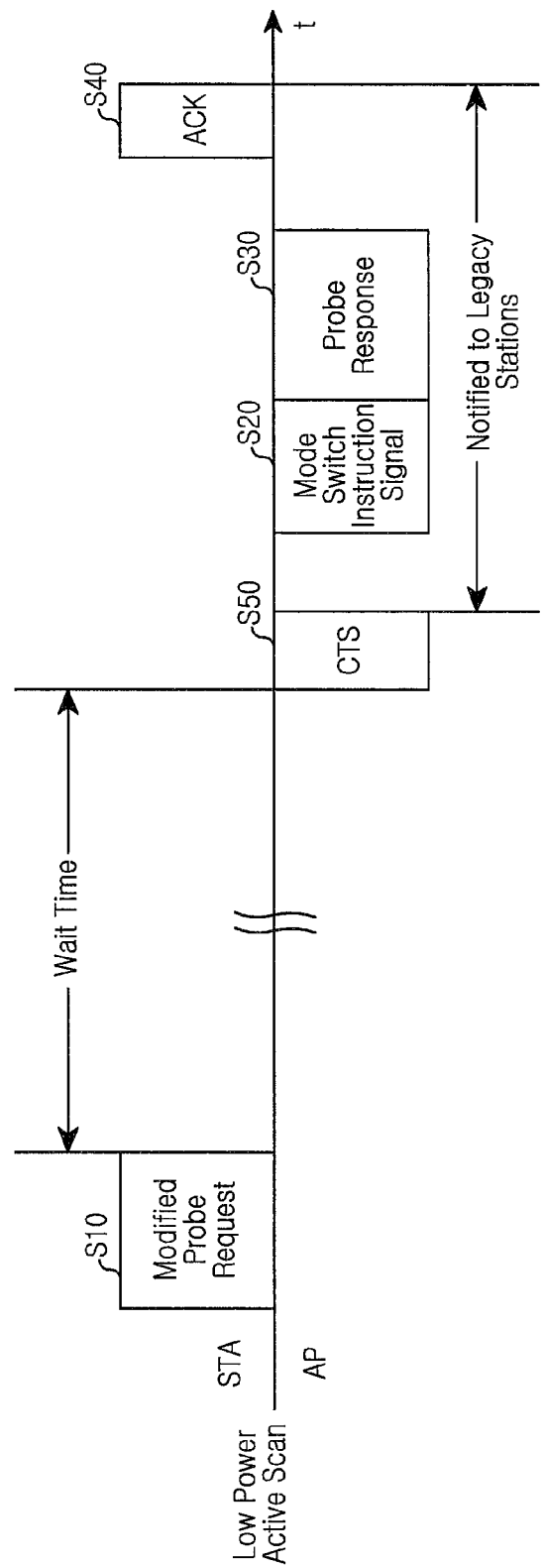
FIG. 12 illustrates an AP discovering procedure in a WLAN system according to another exemplary embodiment of the present disclosure.

FIG. 12 is a view illustrating an AP discovering procedure in a WLAN system according to another exemplary embodiment of the present disclosure. This drawing shows a frame exchange between an AP and an STA when the WLAN station uses an active scan in discovering the AP. In this exemplary embodiment, the AP may transmit a CTS frame S50 prior to transmitting a probe response frame S30 to which a mode switch instruction signal S20 is attached. The AP informs the legacy stations of time for transmitting the mode switch instruction signal S20 and the probe response frame S30 via the CTS frame S50. In this case, the legacy stations which receive the CTS frame S50 determine that a wireless channel is occupied during the corresponding time and thus do not try to transmit the frame. Therefore, the AP can transmit the probe response frame S30 safely.

Referring to FIG. 12, the station transmits a probe request frame S10 containing the station's own identification. This identification may be a certain number within a limited range (for example, a certain number less than 64) or may be some lower bit of a MAC address of the station. The AP which receives the probe request frame generates and transmits the CTS frame S50 prior to transmitting the probe response frame S30 to which the mode switch instruction signal S20 is attached.

Next, the AP transmits the mode switch instruction signal S20 prior to transmitting the probe response frame S30. The mode switch instruction signal S20 is a signal which is detectable by the station in the low power mode. According to an exemplary embodiment, the mode switch instruction signal S20 may be a low power preamble. The low power preamble includes the identification information of the station which is transmitted via the probe request frame S10. According to an exemplary embodiment, the low power preamble may be a preamble which operates at low speed according to the WLAN standard 802.11 ah. According to another exemplary embodiment, the low power preamble may be a binary sequence.

The station may operate in the low power mode after transmitting the probe request frame S10 until receiving the probe response frame S30. When the probe response frame S30 is received in the low power mode, the station transmits an ACK signal S40 to the AP in response to the probe response frame S30. According to an exemplary embodiment, in the low power mode, the station may drive only the low power analog receiver 136 and the low power digital receiver 126 as shown in FIG. 2A. According to another exemplary embodiment, in the low power mode, the station may drive only the analog receiver 132 and the low power digital receiver 126 as shown in FIG. 2B. According to another exemplary embodiment, in the low power mode, the station may drive only the low power analog receiver 136 and the ADC 128 as shown in FIG. 2C.

Figure 13:
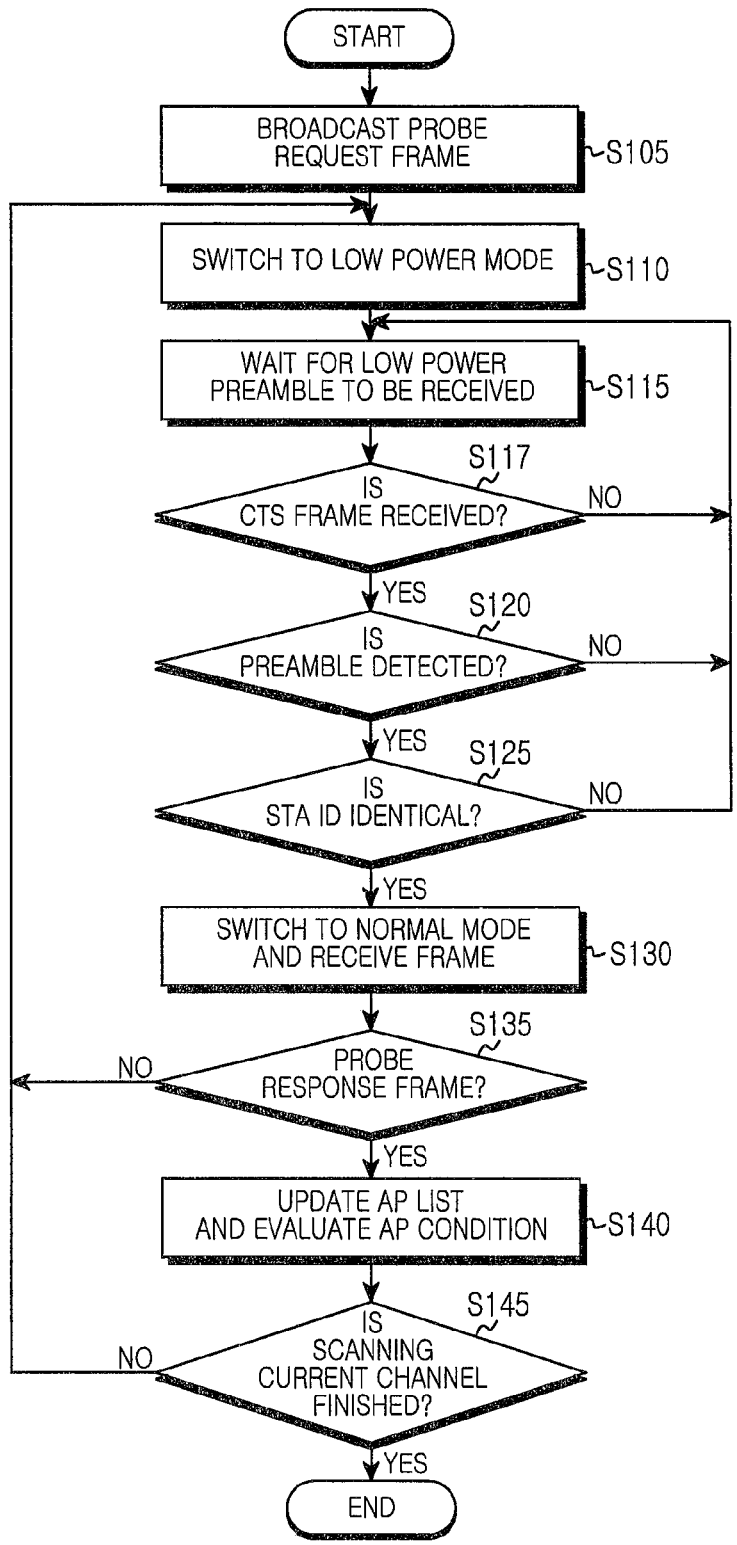
FIG. 13 is a flowchart illustrating an operation of a station for an AP discovering procedure according to another exemplary embodiment of the present disclosure.

FIG. 13 is a flowchart illustrating an operation of a station for an AP discovering operation according to another exemplary embodiment of the present disclosure. The flowchart of FIG. 13 an example and may be changed without departing from the scope of the present disclosure. For example, the AP discovering operation may be performed for each channel for scanning the AP and operations of setting a maximum time for staying in a corresponding channel and stopping scanning may be performed. Such operations are the same as those in the related-art method and thus are not illustrated. In addition, the low power preamble is used as the mode switch instruction signal in FIG. 13. However, it should be noted that when another signal is used as the mode switch instruction signal detectable in the low power mode, the same processing operations are performed.

Referring to FIG. 13, the station generates a probe request frame in the normal mode and broadcasts the probe request frame (S105). After transmitting the probe request frame, the station switches to the low power mode (S110) and waits for the low power preamble to be received (S115). After switching to the low power mode, only some element of the receiver elements may be driven as shown in FIGS. 2A to 2C. According to an exemplary embodiment, only the low power analog receiver 136 and the low power digital receiver 126 may receive power from the battery 105 and power supply to the other elements may be shut off as shown in FIG. 2A. According to another exemplary embodiment, only the analog receiver 132 and the low power digital receiver 126 may receive power from the battery 105 and power supply to the other elements may be shut off as shown in FIG. 2B. According to another exemplary embodiment, only the low power analog receiver 136 and the ADC 128 may receive power from the battery 105 and power supply to the other elements may be shut off as shown in FIG. 2C.

The station determines whether a CTS frame is received or not (S117). When it is determined that the CTS frame is received, the station determines whether the low power preamble is detected or not, and, when the low power preamble is detected, determines whether a station identification (STA ID) included in the low power preamble is identical to, matches, or is the same as the station's own identification (S120 and S125). When the low power preamble is detected and the station identification is identical, the station switches to the normal mode and receives a probe response frame (S130). After switching to the normal mode, the station normally supplies power to the analog receiver 132, the digital receiver 122, the digital transmitter 124, and the analog receiver 134 from among the elements of the station shown in FIGS. 2A to 2C.

When the station determines that probe response frame is received (S135), the station updates a list of APs and evaluates an AP condition (S140), and determines whether to finish scanning a current channel (S145). The AP condition is evaluated based on information provided by the received probe response information. When the station evaluates a corresponding AP as having a good condition for connecting, that is, when it is determined that requirements such as a signal intensity, a support function, a speed, a delay time, etc., are satisfied, the station finishes scanning the channel in early stage.

Figure 14:
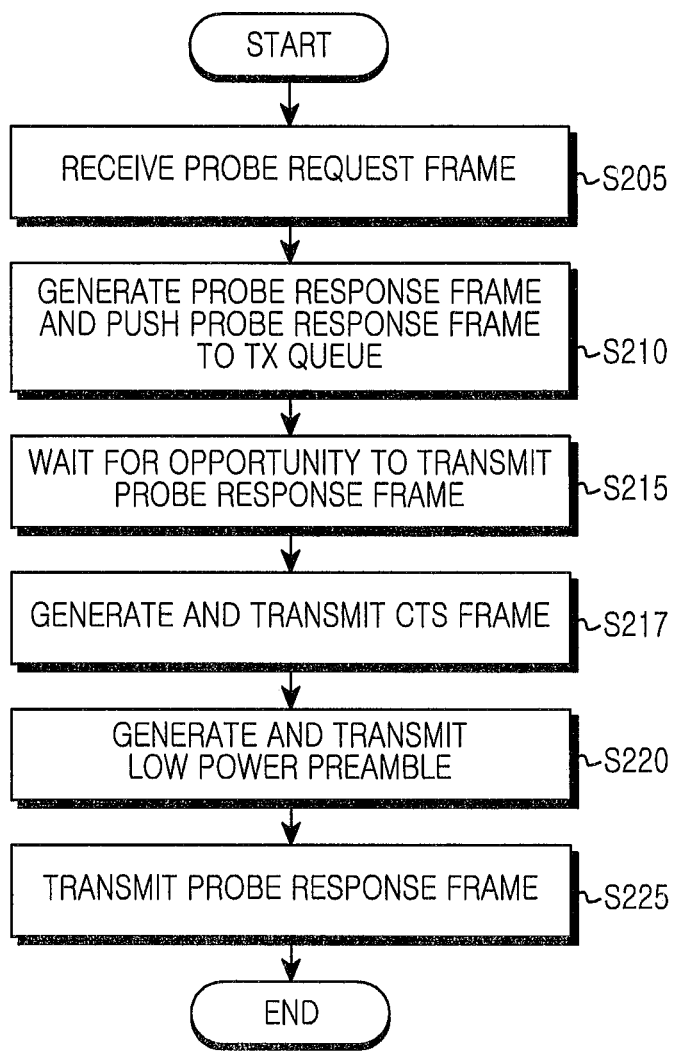
FIG. 14 is a flowchart illustrating an operation of an AP for an AP discovering procedure according to another exemplary embodiment of the present disclosure.

FIG. 14 is a flowchart illustrating an operation of an AP for an AP discovering operation according to another exemplary embodiment of the present disclosure. The flowchart shown in FIG. 14 an example and may be changed without departing from the scope of the present disclosure. For example, FIG. 14 illustrates operations of the AP for generating a probe response frame in response to a probe request frame received from a single station, and transmitting the probe response frame. However, when a plurality of stations exist, the same flowchart may be extended and used. In addition, although FIG. 14 illustrates operations subsequent to the operation of receiving the probe request frame, it is understood by those of ordinary skill in the art that the AP performs various other operations in addition to these operations.

Referring to FIG. 14, the AP receives a probe request frame supporting the low power mode from the station (S205). In response to the probe request frame being received, the AP generates a probe response frame and pushes the probe response frame to a TX queue (not shown) (S210). The AP waits for a TX opportunity to transmit the probe response frame (S215). At the TX opportunity for the probe response frame, the AP generates a CTS frame first and transmits the CTS frame to the station (S217), and then generates a low power preamble and transmits the low power preamble to the station (S220). After transmitting the low power preamble, the AP transmits the probe response frame to the station (S225).

Figures 15A, 15B:
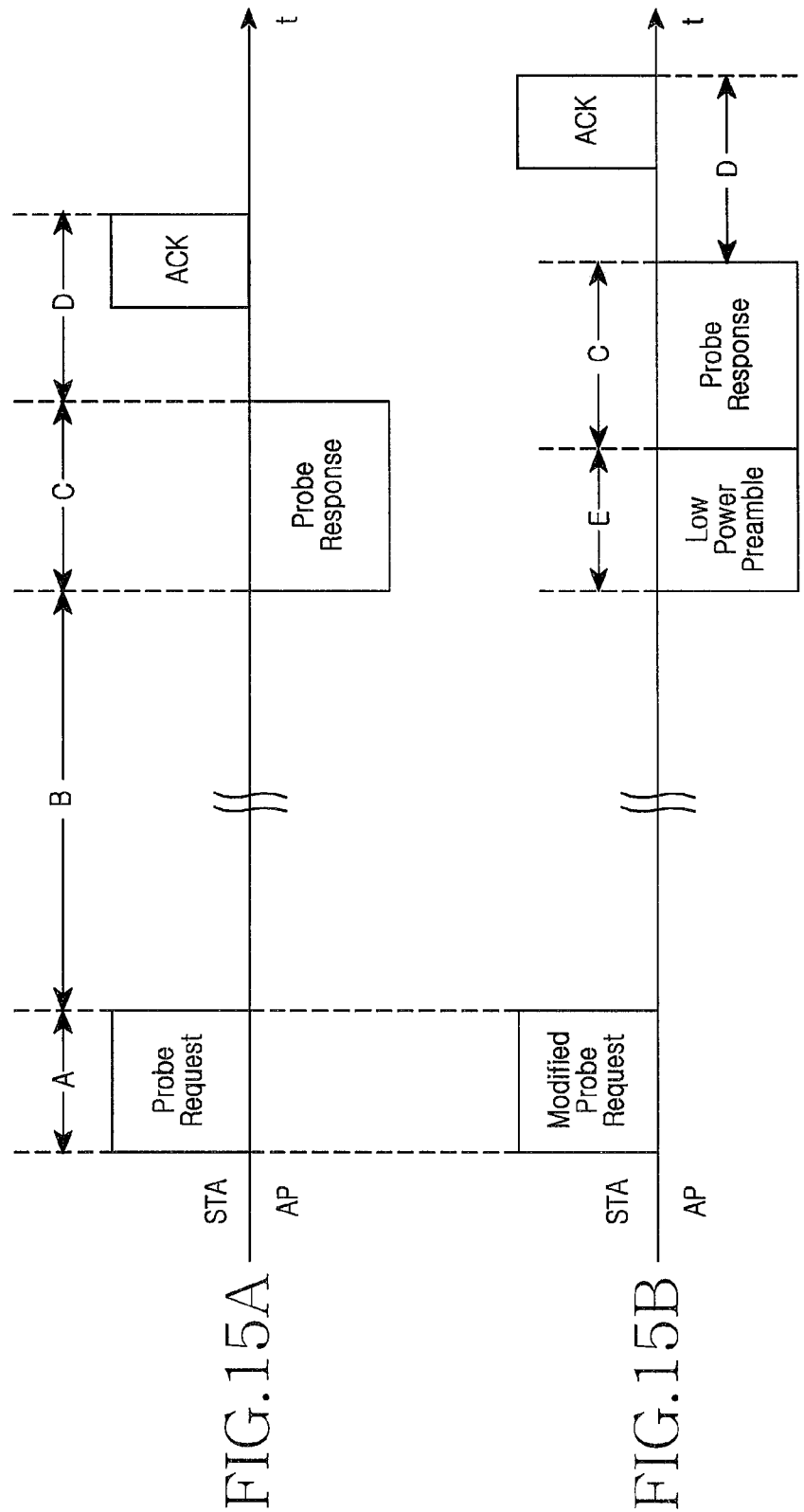
FIGS. 15A and 15B illustrate an AP discovering operation having the effect of saving power according to exemplary embodiments of the present disclosure.

FIGS. 15A and 15B are views to illustrate the AP discovering operation having the effect of saving power at the station according to an exemplary embodiment of the present disclosure. In FIGS. 15A and 15B, A is a transmission time of a probe request frame, B is a waiting time until a probe response frame is received, C is a reception time of the probe response frame, D is a time during which the station transmits an ACK in response to the probe response frame being received, and E is a length of the low power preamble. For example, a time for each section may be calculated according to the WLAN standards as shown in table 1 presented below:

TABLE 1

A: 600 [μs], in case of 440 bytes Probe Request and 6 Mbps PHY rate.
B: (K + 1) * 150 [ms], in case of 50 or more Stations, K represents the number of frames in TX Queue, before AP receives Probe Request.
C: 980 [μs], in case of 720 bytes Probe Response and 6 Mbps PHY rate.
D: 64 [μs], in case of 6 Mbps PHY rate.
E: 100 [μs], assumption value, 80 [μs] is for WLAN preamble.

When it is assumed that $P_{TX}$, $P_{RX}$, $P_{IDLE}$, and $P_{LP}$ are power consumption in a transmission mode, a reception mode, a waiting mode, and a low power mode, respectively, average power consumption $P_{normal}$ of the related-art station as shown in FIG. 15A may be expressed by Equation 1 presented below:

$$P_{normal} = \frac{A \cdot P_{TX} + B \cdot P_{IDLE} + C \cdot P_{RX} + D \cdot P_{TX}}{A + B + C + D} \quad \text{Equation 1}$$

Likewise, power consumption $P_{lowpower}$ according to exemplary embodiments of the present disclosure may be expressed by Equation 2 presented below:

$$P_{lowpower} = \frac{A \cdot P_{TX} + B \cdot P_{LP} + E \cdot P_{LP} + C \cdot P_{RX} + D \cdot P_{TX}}{A + B + C + D + E} \quad \text{Equation 2}$$

It is common that $P_{TX}$ is 1.5 times higher than $P_{RX}$ and $P_{RX}$ is equivalent to $P_{IDLE}$. When $P_{LP}$ is 0.5 times higher than $P_{IDLE}$ and K=0, Equation 1 and Equation 2 may be expressed by Equation 3 presented below for $P_{IDLE}$:

$$P_{normal} \approx P_{IDLE}, \quad P_{lowpower} \approx \frac{1}{2} P_{IDLE} \quad \text{Equation 3}$$

As a result, since the time of the B section is longer than the other sections when many stations exist, the power consumption of the related-art method converges on the power consumption in the waiting mode and the power consumption according to exemplary embodiments of the present disclosure converges on the power consumption in the low power mode. Since it is highly likely that K<0 when many stations exist, the above results may converge more. The power consumption in the low power mode may vary according to how the station is implemented. When the analog/digital receivers are implemented in the low power mode, a greater effect than mentioned above can be expected.

Various situations may be assumed to explain examples of the AP discovering procedure. First, it is assumed that a plurality of stations discover an AP in the same channel and 10 stations from among these stations generate the same STA ID by accident. In this case, the STA may be wrongly awaken up to 9 times. In this case, the power consumption can be reduced by 45% as indicated by Equation 4 presented below:

$$P_{lowpower} = \frac{A \cdot P_{TX} + (B - 9 \cdot C) \cdot P_{LP} + E \cdot P_{LP} + 10 \cdot C \cdot P_{RX} + D \cdot P_{TX}}{A + B + C + D + E} \approx 0.55 \cdot P_{IDLE}$$

Equation 4

It is assumed that a plurality of probe response frames are received during the time B since there are many neighboring APs. When there are 30 APs, the STA is awaken 30 times in total and the power consumption can be reduced by 40% as indicated by Equation 5 presented below:

$$P_{lowpower} = \frac{A \cdot P_{TX} + (B - 29 \cdot C) \cdot P_{LP} + E \cdot P_{LP} + 30 \cdot C \cdot P_{RX} + D \cdot P_{TX}}{A + B + C + D + E} \approx 0.60 \cdot P_{IDLE}$$

Equation 5

According to exemplary embodiments of the present disclosure described above, when the station using a battery and having mobility discovers the AP as in the WLAN system, the station is driven in the low power mode during the waiting section after transmitting the probe request frame until receiving the probe response frame, so that power consumption can be reduced.

While the present disclosure has been described with reference to limited exemplary embodiments and drawings, it will be understood by those of ordinary skill in the art that the present disclosure is not limited to the above-described exemplary embodiments and various modifications and changes may be made based on the above descriptions. Although exemplary embodiments of the present disclosure are applied to the WLAN system, the protection scope of the present disclosure is not limited to this. For example, exemplary embodiments can be applied to all wireless communication systems in which a terminal transmits a probe request to central nodes to discover any neighboring central node and waits a response to be received for a predetermined time, similarly to the WLAN system. In another example, although exemplary embodiments of the present disclosure are limited to an example of an AP discovering procedure between a single station and APs, exemplary embodiments of the present disclosure may be equally applied to an AP discovering procedure between a plurality of stations and APs. In another example, although the operations according to exemplary embodiments of the present disclosure are performed by the elements of the station and the AP having the configurations as shown in FIGS. 2A to 2C and FIGS. 3A to 3C, the operations according to exemplary embodiments of the present disclosure may be performed by elements of a station and an AP having appropriate configurations. The operations according to exemplary embodiments of the present disclosure may be implemented by a processor. In this case, the operations according to embodiments of the present disclosure may be implemented by a processor. In this case, program commands for performing operations implemented by various computers may be recorded in a computer-readable medium. The computer-readable recording medium may include program commands, data files, and data structures either alone or in combination. The program commands may be those that are especially designed and configured for the present disclosure, or may be those that are publicly known and available to those skilled in the art. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes created by a compiler, and high-level language codes that can be executed by a computer by using an interpreter. When all or some of a base station or a relay described in the present disclosure is implemented by a computer program, a computer-readable recording medium storing the computer program is also included in the present disclosure. Therefore, the scope of the disclosure is defined not by the detailed description of the disclosure but by the appended claims, and all differences within the scope will be construed as being included in the present disclosure.

What is claimed is:

1. A method for operating a terminal in a wireless communication system, the method comprising:
    transmitting a probe request signal to at least one central node;
    in response to transmitting the probe request signal, switching mode of the terminal to a low power mode;
    receiving, from a central node among the at least one central node, a mode switch instruction signal by using a part of elements of a transceiver, in the low power mode;
    in response to the mode switch instruction signal, switching the mode of the terminal from the low power mode to a normal mode; and
    receiving, from the central node, a probe response signal corresponding to the probe request signal by using the elements of the transceiver, in the normal mode,
    wherein the probe request signal is transmitted for discovering the at least one central node.

2. The method of claim 1, wherein the mode switch instruction signal comprises a low power preamble.

3. The method of claim 2, wherein the low power preamble comprises at least one of a preamble having a sampling rate relatively lower than another sampling rate of a normal mode preamble, and a binary sequence.

4. The method of claim 2, wherein the low power preamble comprises at least one of a switching field to guarantee a time that the terminal is requested to switch from the low power mode to the normal mode, and identification information of the terminal.

5. The method of claim 2, wherein the low power preamble is received via a specific sub channel selected among a plurality of sub channels.

6. The method of claim 1, wherein the probe request signal comprises identification information of the terminal.

7. The method of claim 1,
wherein the terminal comprises a normal receiver and a low power receiver,
wherein the low power receiver is driven in the low power mode,
wherein the central node comprises an access point (AP) of a wireless local area network (WLAN) system, and
wherein the terminal comprises a station of the WLAN system.

8. The method of claim 1, further comprising receiving information on a time for transmitting the mode switch instruction signal and the probe response signal.

9. A method for operating a central node of a wireless communication system, the method comprising:
receiving, from a terminal, a probe request signal;
in response to receiving the probe request signal, transmitting, to the terminal, a mode switch instruction signal, wherein the mode switch instruction signal comprises instructions to switch a mode of the terminal from a low power mode to a normal power mode and is received by the terminal using a part of elements of a transceiver in the low power mode; and
transmitting, to the terminal, a probe response signal in response to the probe request signal after transmitting the mode switch instruction signal,
wherein the probe request signal is received by the terminal using the elements of the transceiver in the normal power mode, and
wherein the probe request signal is transmitted by the terminal, for discovering the central node.

10. The method of claim 9, wherein the mode switch instruction signal comprises a low power preamble.

11. The method of claim 10, wherein the low power preamble comprises at least one of a preamble having a sampling rate relatively lower than another sampling rate of a normal mode preamble, and a binary sequence.

12. The method of claim 10, wherein the low power preamble comprises at least one of a switching field to guarantee a time that the terminal is requested to switch from the low power mode to a normal mode, and identification information of the terminal.

13. The method of claim 10, wherein the low power preamble is transmitted via a specific sub channel selected among a plurality of sub channels.

14. The method of claim 9, wherein the probe request signal comprises identification information of the terminal.

15. The method of claim 9, further comprising transmitting information on a time for transmitting the mode switch instruction signal and the probe response signal.

16. The method of claim 9,
wherein the central node comprises an access point (AP) of a wireless local area network (WLAN) system, and
wherein the terminal comprises a station of the WLAN system.

17. A terminal of a wireless communication system, the terminal comprising:
a transceiver configured to transmit a probe request signal to at least one central node; and
a controller configured to switch a mode of the terminal to a low power mode in response to transmitting the probe request signal,
wherein the transceiver is further configured to receive, from a central node among the at least one central node, a mode switch instruction signal by using a part of elements of the transceiver, in the low power mode,
wherein the controller is further configured to switch the mode of the terminal from the low power mode to a normal mode in response to the mode switch instruction signal,
wherein the transceiver is further configured to receive, from the central node, a probe response signal corresponding to the probe request signal by using the elements of the transceiver, in the normal mode, and
wherein the probe request signal is transmitted for discovering the at least one central node.

18. The ten final of claim 17, wherein the mode switch instruction signal comprises a low power preamble.

19. The terminal of claim 18, wherein the low power preamble comprises at least one of a preamble having a sampling rate relatively lower than another sampling rate of a normal mode preamble, and a binary sequence.

20. The terminal of claim 18, wherein the low power preamble comprises at least one of a switching field to guarantee a time that the terminal is requested to switch from the low power mode to the normal mode, identification information of the terminal.

21. The terminal of claim 18, wherein the low power preamble is received via a specific sub channel selected among a plurality of sub channels.

22. The terminal of claim 17, wherein the probe request signal comprises identification information of the terminal.

23. The terminal of claim 22,
wherein the terminal comprises a normal receiver and a low power receiver,
wherein the controller is configured to drive the terminal in the low power mode by driving the low power receiver,
wherein the central node comprises an access point (AP) of a wireless local area network (WLAN) system, and
wherein the terminal comprises a station of the WLAN system.

24. The terminal of claim 17, wherein the transceiver is further configured to receive information on a time for transmitting the mode switch instruction signal and the probe response signal.

25. A central node of a wireless communication system, the central node comprising:
a transceiver configured to:
receive, from a terminal, a probe request signal;
in response to receiving the probe request signal, transmit, to the terminal, a mode switch instruction signal while the terminal is in a low power mode, wherein the mode switch instruction signal comprises instructions to switch a mode of the terminal from the low power mode to a normal power mode and is received by the terminal using a part of elements of a transceiver in the low power mode; and
transmit, to the terminal, a probe response signal in response to the probe request signal after transmission of the mode switch instruction signal,
wherein the probe request signal is received by the terminal using the elements of the transceiver in the normal mode, and
wherein the probe request signal is transmitted by the terminal, for discovering the central node.

26. The central node of claim 25, wherein the mode switch instruction signal comprises a low power preamble.

27. The central node of claim 26, wherein the low power preamble comprises at least one of a preamble having a sampling rate relatively lower than another sampling rate of a normal mode preamble, and a binary sequence.

28. The central node of claim 26, wherein the low power preamble comprises at least one of a switching field to guarantee a time that the terminal is requested to switch from the low power mode to a normal mode, and identification information of the terminal.

29. The central node of claim 26, wherein the low power preamble is transmitted via a specific sub channel selected among a plurality of sub channels.

30. The central node of claim 25, wherein the probe request signal comprises identification information of the terminal.

31. The central node of claim 25, wherein the transceiver is further configured to transmit information on a time for transmitting the mode switch instruction signal and the probe response signal.

32. The central node of claim 25,
wherein the central node comprises an access point (AP) of a wireless local area network (WLAN) system, and
wherein the terminal comprises a station of the WLAN system.

* * * * *